March 10, 1953 C. R. ALDEN 2,631,218
HEAT EXCHANGE DEVICE AND TEMPERATURE CONTROL THEREFOR
Filed Sept. 15, 1949 2 SHEETS—SHEET 1

INVENTOR.
Carroll R. Alden
BY
Carlson, Pitzner, Hubbard & Wolfe
Attys.

March 10, 1953 C. R. ALDEN 2,631,218
HEAT EXCHANGE DEVICE AND TEMPERATURE CONTROL THEREFOR
Filed Sept. 15, 1949 2 SHEETS—SHEET 2

INVENTOR.
Carroll R. Alden
BY
Carlson, Pitzner, Hubbard & Wolfe
Attys.

Patented Mar. 10, 1953

2,631,218

UNITED STATES PATENT OFFICE 2,631,218

HEAT EXCHANGE DEVICE AND TEMPERATURE CONTROL THEREFOR

Carroll R. Alden, Detroit, Mich., assignor to Ex-Cell-O Corporation, Detroit, Mich., a corporation of Michigan Application September 15, 1949, Serial No. 115,941

22 Claims. (Cl. 219—40)

The present invention relates generally to means for applying heat to a fluid and more specifically to a system including a unit for raising the temperature of a moving fluid to a relatively constant value through the application of heat at a controlled rate. The invention finds particular but by no means exclusive utility in connection with the continuous-flow pasteurization of milk.

Temperature control systems heretofore commercially available for the purposes set forth above generally comprise one or more thermostatic devices arranged to control a suitable heating means. Such systems operate on the basis of adding heat at the maximum available rate as long as the temperature of the substance being heated remains below a predetermined value. Conversely, these systems immediately reduce the rate of heat application to zero as soon as the temperature of the heated substance exceeds the predetermined value. Such systems consequently tend to overshoot and undershoot, causing substantial fluctuations in the desired temperature. Although simple thermostatic devices now commercially available are capable of reliably responding to changes in temperature as slight as from 0.1 to 0.01 of 1° F., they are subject to the severe limitation of indicating a temperature deviation qualitatively but not quantitatively. Hence it is a common practice to utilize a plurality of thermostatic devices, one being adjusted for response to a maximum temperature and the other a minimum temperature, the optimum or predetermined temperature value being located between the maximum and minimum. Systems using thermostatic devices in this manner have an overall accuracy far below the inherent accuracy of response of the thermostatic devices.

Accordingly, one object of the present invention is to provide a novel temperature control system for heating a moving fluid to a predetermined temperature, such system having an overall accuracy commensurate with the inherent accuracy of response of its thermostatic device.

Another object of the invention is to provide a novel system of the foregoing type which will be adapted to maintain the temperature of the heated fluid with a high degree of precision notwithstanding variations in flow as well as in the initial temperature and composition of the incoming fluid.

A further object is to provide a novel heater for use in a system of the character set forth.

Another object is to provide a temperature control system and heater of the above type and which will be adapted for stable operation with electrolytic fluids having negative temperature coefficients of specific resistance.

A more specific object is to provide a temperature control system and heater of the above character and which will be particularly well adapted for the continuous-flow pasteurization of fluids such as milk.

Other objects and advantages will become apparent as the following detailed description proceeds, taken in connection with the accompanying drawings, wherein.

While the invention is susceptible of various modifications and alternative constructions, the preferred embodiments have been shown in the drawings and will be described below in considerable detail. It should be understood, however, that there is no intention to limit the invention to the specific forms disclosed, but on the contrary, the invention is to cover all modifications and alternative constructions falling within the spirit and scope of the invention as expressed in the appended claims.

Figure 1:
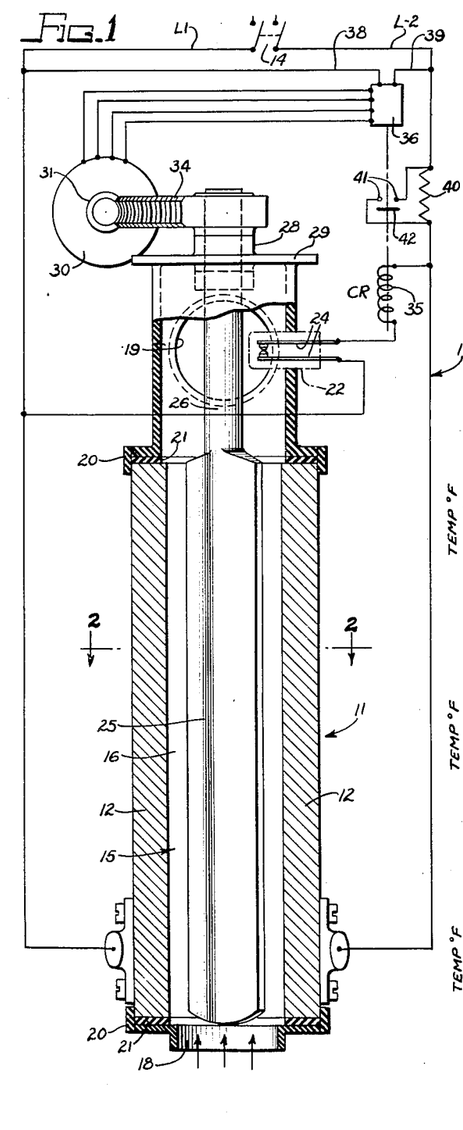
Figure 1 is a diagrammatic view of a novel temperature control system and heater embodying the present invention.
Figure 2:
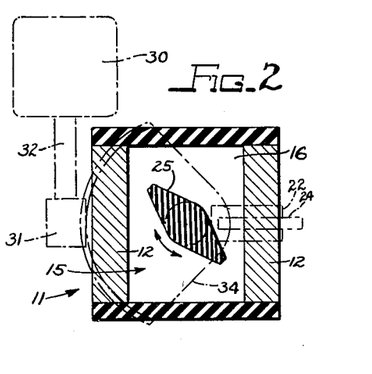
Fig. 2 is a transverse sectional view taken horizontally through the heater illustrated in Fig. 1 and in the plane of the line 2—2.

Referring more specifically to Figs. 1 and 2, there is shown an illustrative temperature control system 10 for raising to a predetermined level the temperature of a continuously flowing stream of fluid. In the present instance, the system 10 includes an electrical heater 11 which is designed for the continuous-flow pasteurization of an electrolytic fluid such as milk. The heater 11 raises the temperature of the fluid by passing an alternating current between spaced electrodes 12 immersed in, or in contact with, the fluid stream. Power may be supplied to the system 10 and heater 11 from any suitable source of alternating current via main line switch 14 and line conductors L1, L2. Although the invention is equally well adapted for use with heating devices energized from multiphase sources, a single-phase heater has been shown for purposes of simplicity in illustration.

Turning first to the heater 11, it will be perceived that the latter comprises a hollow body 15 having walls defining therein a fluid passage or heating chamber 16 running longitudinally of the body. At its lower end, the body 15 is provided with a fluid inlet 18 and at its upper end with a fluid outlet 19, both the inlet and the outlet communicating freely with the chamber 16. The inlet 18 and outlet 19 may, of course, be connected in any well-known manner to external conduits adapted to direct a flow of fluid through the chamber 16 for processing. While the invention is not concerned with the assembly details of the body 15, it might be noted in passing that the inlet and outlet fittings are secured to the central or electrode section of the body by means of nonconductive bands 20, an appropriate gasket 21 being interposed between each fitting and the adjacent edges of the electrodes 12.

Provision is made in the system 10 for controlling within narrow limits the final temperature of the fluid passing through the heater 11 by utilizing to the fullest possible extent the inherent sensitivity of a single throw temperature responsive or thermostatic device which normally reacts to temperature changes at a predetermined level. This is accomplished by causing the system to effect continuously and automatically changes in the rate of heat application, each such change being of appropriate direction and of a magnitude which is proportional to the need for the change. Accordingly, the system 10 includes a principal heat control means and a secondary heat control means both adapted to alter the heat input to the fluid in the heater. The principal heat control means is adapted to effect a relatively slow, progressive and unlimited response to a departure of the final fluid temperature from its predetermined value. The secondary heat control means, on the other hand, is adapted to effect an immediate, total and limited response to a departure of the final fluid temperature from the predetermined value. Both the principal and the secondary heat control means are governed by the thermostatic device in a manner which renders the latter responsive to the difference between the average temperature of the fluid leaving the heater and the predetermined temperature for which the thermostatic device has been set. When this temperature difference is slight, the rate of change of heat application is slight. Conversely, when this temperature difference is great, the rate of change of heat application is made appropriate both in direction and in magnitude to bring the average temperature of the fluid leaving the heater as close as possible to that temperature for which the thermostat is adjusted, the rate of change automatically decreasing as the predetermined temperature is approached.

Referring once more to Figs. 1 and 2, there is schematically shown a thermostatic device 22 projecting into the heating chamber 16 adjacent the outlet 19. The device 22 is preferably a simple bimetallic thermal switch having a pair of contacts 24 with their adjustment centered on the predetermined temperature at which it is desired to maintain the fluid leaving the heater 11. In the present instance, the contacts 24 are adapted to close when the final or outgoing fluid temperature drops below the predetermined value and to open when the outgoing fluid temperature rises above such value. For all practical purposes, the response of the contacts 24 is substantially instantaneous.

The principal heat control means utilized in the system 10 involves an arrangement for varying the input of heat to the fluid within the heating chamber 16 through variation of the effective electrical resistance interposed in a heating circuit. This is accomplished in the present instance by providing the heater 11 with electrodes 12 and a dielectric or nonconductive member adjustably positionable to vary the effective resistance of the volume of liquid between the electrodes 12. Thus there is mounted within the heating chamber a nonconductive shield 25 having an integral supporting stem 26 journaled in boss 28 of top body panel 29. With the foregoing structure, the effective resistance between the electrodes 12 may be varied simply by altering the angular position of the shield 25 so as to change the cross-sectional area of the electrolytic current path between the electrodes. When positioned with its plane perpendicular to the plane of the electrodes 12, the shield 25 creates a minimum of resistance to current flow through the electrolyte within the heating chamber 16. On the other hand, when rotated 90° from this position so that its plane becomes parallel to the plane of the electrodes, the shield 25 creates a maximum of resistance to current flow, thereby decreasing substantially the heat input to the fluid within the chamber 16. In order to smooth out the curve of resistance changes for various angular positions of the shield 25, the latter is preferably fashioned with a substantially diamond shaped cross section.

Angular movement of the shield 25 in either direction may readily be effected by means such as reversible electric motor 30 having a worm 31 fixed to its drive shaft 32. Power is transmitted from the worm 31 to the shield 25 as by means of a gear sector 34 which is fixed to the upper end of the supporting stem 26 outside top body panel 29.

To permit governing of the principal heat control means by the thermostatic device 22, there is provided a control relay CR having an actuating coil 35 connected in series with the contacts 24 across line conductors L1, L2. By means of an appropriate linkage (not detailed) the control relay CR is enabled to actuate a motor reversing switch 36 which receives power from line conductors L1, L2 via conductors 38, 39. When the contacts 24 of the thermostatic device are closed due to a drop in final fluid temperature below the predetermined level, the relay CR becomes energized and through the reversing switch 36 causes the motor to drive the shield 25 in a direction which decreases the effective resistance between the electrodes 12 so as to increase the energy input to the fluid within the heating chamber. Conversely, when the contacts 24 open due to an increase in fluid temperature, the relay CR becomes de-energized and shifts the motor reversing switch into its alternative position wherein the motor rotates the shield 25 in the opposite direction so as to increase the resistance between the electrodes and thereby decrease the energy input to the fluid in the heating chamber.

Turning now to the secondary heat control, it will be noted that the latter comprises means for effecting slight changes in the input of heat to the fluid within the heating chamber 16. This is accomplished in the present instance by effecting comparatively slight changes in the potential applied to the electrodes 12 by selectively interposing or shunting out of their circuit a relatively small resistance or reactance. Referring to Fig. 1, it will be perceived that there is series-connected in line conductor L2 a resistor 40 having a value which is sufficient to create a relatively small drop in the potential applied to the electrodes. This potential drop is desirably only a very small fraction of the potential applied to the electrodes. Its magnitude should, however, be sufficient to compensate for changes in the resistance of the electrolytic fluid resulting from slight changes in temperature. The magnitude of the potential drop should also be sufficient to compensate for relatively slight changes in the temperature of the incoming fluid.

To permit governing of the secondary heat control means by the thermostatic device 22, there is associated with the resistor 40 a by-pass switch having fixed contacts 41 and a bridging contact member 42. The operation of the switch is directly accomplished by the control relay CR. The relationship between these members is such that when the relay CR becomes energized as a result of a drop in fluid temperature and closure of the thermal switch contacts 24, the contacts 41, 42 of the by-pass switch will be closed and thereby render the resistor 40 ineffective with respect to the electrode circuit. On the other hand, when the control relay CR becomes de-energized due to an increase in fluid temperature, the contacts 41, 42 simultaneously open and inject the potential drop of the resistor 40 into the electrode circuit so as to effect a decrease in the energy input to the fluid. It should be borne in mind that the cyclical and fractional variations in final fluid temperature occasioned by rendering the resistor 40 successively effective and ineffective are of primary importance in achieving satisfactory temperature control but produce no substantial changes in the final fluid temperature because of their close proximity to the predetermined temperature at which the device 22 responds.

Figure 3:
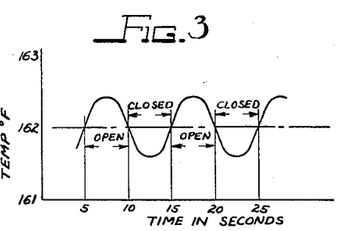
Figs. 3, 4 and 5 are theoretical temperature curves illustrating diagrammatically the performance of the system of Fig. 1 under various operating conditions.

In operation, when the shield 25 has its optimum position for a given rate of flow and initial temperature of the incoming fluid, the contacts 24 of the thermostatic device 22 open and close in continuing cycles of relatively short duration at a ratio of open to closed time approximately equal to 1. Such action is shown diagrammatically in Fig. 3 where, for purposes of illustration only, it is assumed that the predetermined temperature level to be maintained in the outgoing fluid is 162° F. and that the duration of one complete operating cycle of the thermal switch contacts 24 is approximately 10 seconds. Under these conditions, the motor 30 will operate for equal times in each direction with the net result of no effective traverse for the shield 25. In other words, upon opening of the contacts 24 as a result of a fractional excess in the final fluid temperature over the predetermined level, institution of motor operation in the proper direction to increase the chamber resistance takes place. The motor will continue to operate in such direction as long as the contacts 24 remain open. When the temperature of the fluid leaving the heating chamber drops fractionally below the predetermined temperature, either because of the change in potential applied to the electrodes by introducing the potential drop of the resistor 40, or by reason of the change in the position of the shield 25, or both, the contacts 24 will close and institute motor rotation in a direction so as to decrease the chamber resistance. This rotation will continue until the contacts 24 are again opened by the resulting increase in temperature.

Figure 4:
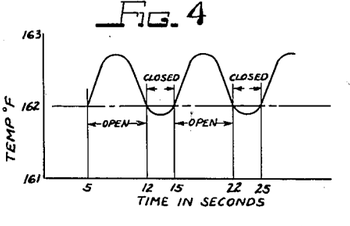
Figure 5:
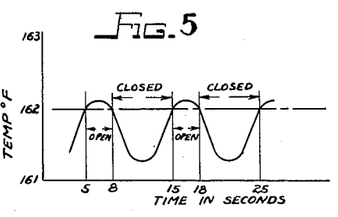

If, in any given cycle of minute temperature variations such as those occasioned by the resistor 40, the ratio of open to closed time is greater than unity (as indicated in Fig. 4), the net effect of motor rotation during such cycle will be to alter the position of the shield 25 in the proper direction to increase the effective resistance between the electrodes, or the heating chamber resistance. This reduces the flow of current through the fluid within the heating chamber and thereby reduces the heat energy input thereto. On the other hand, if the ratio of open to closed time is less than unity (as indicated in Fig. 5), the net result of motor rotation will be to decrease the heating chamber resistance and thereby allow more current to flow therethrough so as to increase the heat energy input to the fluid. As long as the ratio of open time to closed time lies between the limits of zero and infinity, cycling of the contacts 24 will continue. If the ratio of open to closed time becomes infinity, cycling will cease and the motor 30 will travel continuously in that direction which increases the chamber resistance so as to effect a decrease in the heat energy input to the fluid. By the same token, if the ratio of open to closed time becomes zero, cycling of the contacts 24 will also cease and the motor 30 will travel continuously in that direction which will decrease the chamber resistance and thereby increase the heat energy input to the fluid.

In the foregoing system, the rate of heat application subject to the principal heat control means may be rendered adjustable in almost infinitesimal increments responsive to the ratio $O/U$ wherein $O$ is the elapsed time the final fluid temperature remains over the predetermined value and $U$ is the elapsed time the final fluid temperature remains under the predetermined value in that same cycle. The sum $O+U$ is equal to the duration of a cycle of heat changes forced by the secondary heat control means. When the average final temperature of the outgoing fluid equals the predetermined value, the ratio $O/U$ is equal to unity. During such a time, whether its length be one cycle or many cycles of heat fluctuation, the net effect of the principal control means in altering the rate of heat application to the fluid in the heating chamber will be zero.

When the ratio $O/U$ becomes infinity, the principal heat control means will alter the rate of heat application in the negative or decreasing direction at the maximum rate of which the motor drive is capable, such maximum being represented by the letter $M$. By the same token, when the ratio $O/U$ has any value between unity and infinity, the resulting rate of change in the application of heat may be expressed as $M(U/O-1)$. The value of the parenthetical portion of this expression is always negative and lies between 0 and $-1$. On the other hand, when the ratio $O/U$ becomes zero, the motor drive is rendered effective to increase the application of heat at the maximum rate $M$. Where the ratio $O/U$ has any value between zero and unity, the resulting rate of change in the application of heat to the fluid may be expressed by the formula $M(1-O/U)$. The value of the parenthetical portion of this formula is always positive under the foregoing condition and lies between zero and unity.

Figures 6, 7:
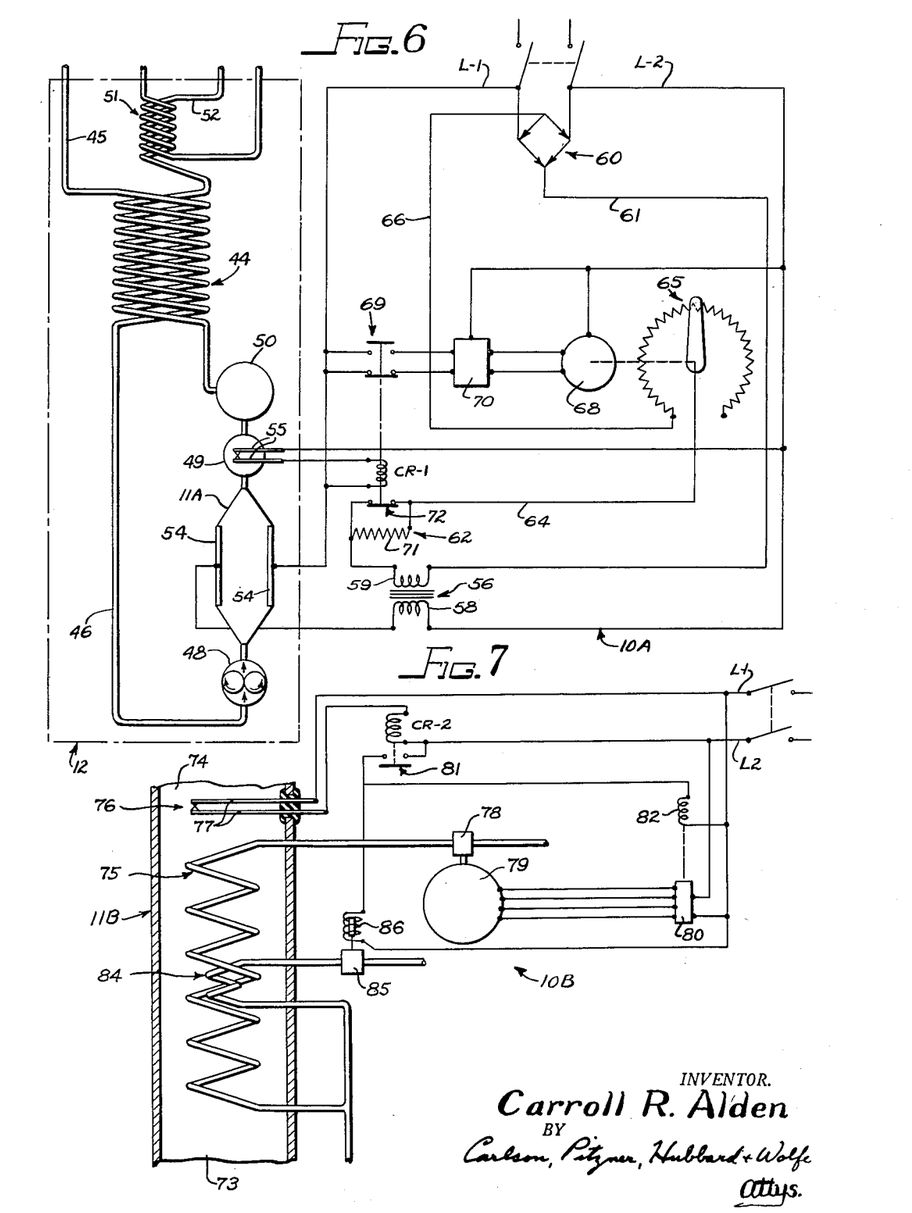
Fig. 6 is a diagrammatic view of a modified temperature control system also embodying the invention and adapted for use with a continuous-flow pasteurizer for fluids such as milk.
Fig. 7 is a diagrammatic view of another modified system also embodying the invention.

Turning now to Fig. 6, there is shown another embodiment of the invention in the form of a temperature control system 10A including a heater 11A which, in the present instance, happens to be incorporated in a continuous-flow pasteurizer 12. Since the mechanical details of the pasteurizer form no part of the present invention, the various components of the pasteurizer have been shown diagrammatically. The fluid to be pasteurized is introduced into a heat exchanger 44 via a conduit 45. In the exchanger 44, the incoming fluid picks up heat from the outgoing pasteurized fluid, whereupon it is led via a conduit 46 to the suction side of a pump 48. The latter forces the fluid through the heater 11A, where its temperature is raised to a predetermined value as determined by the setting of a thermostatic device 49. The heated fluid leaves the heater 11A via the device 49 and is thence conducted to a holding section 50 which is of appropriate design to require a predetermined time interval for each particle of the fluid to pass therethrough. Upon leaving the holding section 50, the pasteurized fluid enters the other side of the heat exchanger 44 and thereupon passes to an outlet cooler 51 which is cooled as by means of a circulating water conduit 52.

Heat energy is supplied to the fluid flowing through the heater 11A as by means of a heating circuit including terminals 54 which may, for example, be electrodes adapted to pass an electric current therethrough. Power is supplied to the electrodes 54 from a suitable alternating current source via line conductors L1, L2. Although an electrolytic heating arrangement has been shown diagrammatically in the drawings, it should be borne in mind that other electrically powered heating means could be used with equal facility.

The system 10A, like the system 10, comprises a principal heat control means and a secondary heat control means, both of which are governed by the thermostatic device 49 which is preferably a thermal switch having bimetallic contacts 55. In the system 10A, however, the principal heat control means comprises a saturable reactor 56 which is adapted to effect substantial changes in the energy input to the fluid within the heater by changing the potential applied to the terminals or electrodes 54. Accordingly, the reactor 56 comprises a main winding 58 interposed in conductor L2 of the heating circuit and a saturating winding 59 connected into a suitable direct current control circuit. The control circuit receives power through an appropriate rectifying means 60 connected across the main power supply L1, L2.

Starting at the rectifying means 60, the control circuit includes conductor 61, saturating winding 59, secondary heat control means 62, conductor 64, rheostat 65, and conductor 66.

To permit governing of the principal heat control means by the thermostatic device 49, provision is made for varying the current through the control circuit, and hence the saturating winding 59, in the proper direction to offset a departure of the final fluid temperature from the predetermined value for which the contacts 55 have been set. Accordingly, there is provided a control relay CR-1 which is series-connected with the contacts 55 and upon closure of the same becomes energized from the line conductors L1, L2. The relay CR-1 is adapted to vary the current in the control circuit by means of reversible motor 68 which operates the rheostat 65. In the present instance, the motor 68 receives power from line conductors L1, L2 through a reversing switch 69 and a time delay unit 70.

As in the system 10, the secondary heat control means 62 of the system 10A comprises a relatively small resistor 71 and a by-pass switch 72 connected in parallel therewith. The thermostatic device 49 governs the actuation of the secondary heat control means 62 through the control relay CR-1, the latter being adapted to actuate the by-pass switch 72. Actuation of the latter, of course, merely serves to cut the resistor 71 into or shunt it out of the control circuit, producing a corresponding variation in the saturation of the reactor 56 with a relatively small change in the heat energy imparted to the fluid by the electrodes 54.

In operation, when the temperature of the fluid leaving the heater 11A rises above the predetermined temperature, the contacts 55 will open. This de-energizes the control relay CR-1 and immediately opens the by-pass switch 72 so as to interpose the full value of resistor 71 into the control circuit. Such action consequently reduces the current in the saturating winding 59 and at the same time causes a corresponding slight increase in the potential drop in the heating circuit due to the reactor 56. Such change decreases the heat energy applied to the fluid by the electrodes 54 and tends to restore the temperature to the predetermined level. Consequently, should the temperature of the outgoing fluid decrease below such predetermined level, the contacts 55 will close and energize the relay CR-1. This immediately shunts out the resistor 71, increasing the current in the control circuit and the saturating winding 59 and thereby effecting a relatively small decrease in the potential drop in the heating circuit due to the winding 58 of the saturable reactor.

When the rheostat 65 is adjusted at its optimum position for a given initial and a given final temperature of the fluid flowing through the heater, the contacts 55 will cycle between their open and closed positions, the intervals of open time and closed time being approximately equal. Since the device 49 may have a sensitivity as sharp as 0.1° F., the actual change in temperature at the contacts 55 may well be no more than a fraction of a degree. With the turbulence and resulting averaging of temperature in the holding section 50, this periodic fluctuation is reduced to an undetectable, or at least, an insignificant fraction of the temperature of the fluid leaving the holding section 50. Where the deviation of the final fluid temperature from the predetermined level is substantial or tends to persist over a considerable period of time, the control relay CR-1 is adapted to effect an adjustment of the rheostat 65 through the motor reversing switch 69, timer 70 and motor 68. To preclude minute and unnecessary adjustments of the rheostat 65, the timer is preferably set for actuation after the passage of an interval of time slightly longer than half of a complete cycle of opening and reclosing of the contacts 55. Thus the motor will not be energized unless there has been a sufficient change in the temperature of the incoming fluid to occasion an unbalance of heat conditions having a duration greater than the response period of the timer. With the foregoing arrangement, each change in the initial temperature of the fluid will correspondingly affect the ratio of open time to closed time of the contacts 55. Each substantial unbalance from the 1:1 ratio of these time intervals will cause the motor 68 to move the rheostat 65 in the appropriate direction and at a suitable time rate of change to restore the perfectly balanced condition.

In Fig. 7, still another embodiment of the invention is shown in the form of a temperature control system 10B having a heater 11B with a fluid inlet 73 and an outlet 74. Heat is applied to the fluid passing through the heater as by means of an element 75 which may, for example, be a set of coils or tubes through which an appropriate thermodynamic medium may be circulated. Adjacent the outlet end 74 of the heater, there is mounted a temperature responsive device or thermostat 76 which is preferably a simple thermal switch having bimetallic contacts 77. The principal heat control means comprises a valve 78 actuated by means such as reversible motor 79 so as to control the amount of thermodynamic fluid supplied to the main heating element 75. The motor 79, in turn, is controllable through a reversing switch 80 which receives power from line conductors L1, L2. The operation of the principal heat control means is, as in the systems described earlier herein, governed by the temperature responsive device 76 through the use of a control relay CR-2 which is arranged to actuate solenoid 82 of the motor reversing switch 80.

The secondary heat control means of the system 10B comprises a relatively small heating element 84 located within the heater 11B and adapted to have a suitable thermodynamic medium circulated therethrough. At the inlet end of the element 84 there is provided a suitable solenoid operated valve 85 adapted to admit or shut out the thermodynamic medium. The operation of the secondary heat control means is also governed by the temperature responsive device 76, the solenoid 86 of the valve 85 being series-connected to the power source L1, L2 via switch 81 of control relay CR-2.

The operation of the system 10B is generally similar to that of the systems already described. Briefly, when the final temperature of the fluid leaving the heater 11B remains substantially at the predetermined level for which the device 76 has been set, the contacts 77 will alternately open and close for approximately equal periods of time and minor deviations in temperature will be appropriately compensated for by the actuation of solenoid valve 85 in response to operation of the control relay CR-2. When the average final temperature departs to the extent that the contacts 77 remain open or closed for unequal intervals of time, the motor actuated valve 78 will be gradually jogged to a position where the balance is restored.

I claim as my invention:

1. A temperature control system for raising the temperature of a moving fluid to a predetermined level through the controlled application of heat thereto, said system comprising the combination of a heater having fluid inlet and discharge connections, a single throw thermostatic switch responsive to the final temperature of the fluid passing through said heater, said single throw thermostatic switch being set to cycle between an open and a closed position about a predetermined level of said final fluid temperature, a principal heat control means for instituting a continuing, progressive and corrective change in the rate of heat application of said heater within periods following the response of said temperature responsive switch to a final fluid temperature departing from said predetermined level, said principal heat control means being governed by said temperature responsive switch, and a secondary heat control means also governed by said temperature responsive switch and adapted to institute an immediate, total and limited corrective change in the rate of heat application following response of said temperature responsive switch to a final fluid temperature departing from the predetermined level.

2. A temperature control system for raising a moving fluid to a predetermined temperature through the controlled application of heat thereto, said system comprising the combination of a heater, means for passing a stream of fluid through said heater, a single throw thermostatic switch responsive to the temperature of the fluid discharged from said heater, said single throw thermostatic switch being set to cycle between an open and a closed position about a predetermined level in the temperature of the fluid discharged from said heater, a principal heat control means for instituting a continuing and progressive increase in the rate of heat application of said heater within periods following the response of said temperature responsive switch to a temperature below a predetermined level and for also instituting a continuing and progressive decrease in the rate of heat application of said heater within periods following the response of said temperature responsive switch to a temperature above the predetermined level, said principal heat control means being governed by said temperature responsive switch, and a secondary heat control means also governed by said temperature responsive switch and adapted to institute an immediate, total and limited increase in the rate of heat application of said heater following response of said temperature responsive switch to a temperature below the predetermined level and to institute an immediate, total and limited decrease in the rate of heat application of said heater following response of said temperature responsive switch to a temperature above the predetermined level.

3. A temperature control system for increasing the temperature of a moving stream of fluid to a predetermined value through the controlled application of heat thereto, said system comprising the combination of means defining a heating chamber for the fluid, a single throw thermostatic device centered for operation at said predetermined value and responsive to the final temperature of the fluid discharged from said heating chamber, a principal heat control means governed by said thermostatic device and adapted for correctively modifying the rate of heat energy input to the fluid within said heating chamber continuously and progressively upon departure of the final fluid temperature from the predetermined value, and a secondary heat control means also governed by said thermostatic device and adapted to correctively modify the rate of heat energy input to the fluid within said heating chamber by a relatively small increment immediately upon departure of the final fluid temperature from said predetermined value.

4. A system for raising the temperature of a fluid to a predetermined value by the application of heat thereto at controlled rates, said system comprising, in combination, means defining a heating chamber for the fluid, a principal heat control means for correctively effecting a gradual and progressive change in the rate of application of heat to the fluid within said heating chamber, a secondary heat control means for correctively effecting an immediate, total and limited change in the rate of application of heat to the fluid within said heating chamber, and a single throw thermal switch centered for operation at said predetermined value and responsive to the temperature of the fluid leaving said heating chamber, said thermal switch being connected with means for correlating the operation of said principal and said secondary heat control means to effect continuous and automatic changes in the rate of heat application to the fluid within said heating chamber, each such change being proportional to the difference between the temperature of the fluid within said heating chamber and the value of the predetermined temperature.

5. A system for maintaining a heated fluid at a predetermined temperature and comprising the combination of a heater, means for passing fluid through said heater, a single throw thermal switch set to cycle between open and closed positions on either side respectively of the predetermined temperature and in response to the temperature of the fluid within said heater, said switch being adapted to open immediately when the fluid temperature departs in one direction from the predetermined temperature and to close immediately when the fluid temperature departs in the opposite direction, a secondary heat control means for immediately changing the rate of heat application by a relatively small increment in either direction depending upon whether said switch is open or closed, and a principal heat control means for effecting a gradual, progressive and corrective net change in the rate of heat application when the ratio of open time to closed time of said switch during a normal operating cycle departs from unity.

6. In a system for precisely maintaining the average temperature of a heated substance at a given level, the combination comprising a heater for the substance, a single throw thermostatic device centered for operation at the given temperature level and responsive to the temperature of the heated substance, and principal and secondary heat control means for adjusting the thermal output of said heater at a rate which remains proportional to the difference between the average temperature of the substance being heated and the given temperature level at which said thermostatic device operates, both said control means being governed by said single throw thermostatic device.

7. In a system for maintaining a heated substance at substantially a predetermined temperature, the combination of a heater, a single throw thermostatic switch operable in response to occurrence of said predetermined temperature in the substance and centered for operation about said temperature, a secondary heat control means operatively associated with said heater and adapted to effect minor changes in the temperature of said substance over a given operating cycle represented as "O + U," "O" being equal to the elapsed time during said cycle that said substance remains in excess of said predetermined temperature, "U" being equal to the elapsed time during said cycle that said substance remains below said predetermined temperature, and a principal heat control means also operatively associated with said heater for governing the thermal output thereof, said principal control means being adapted to increase the thermal output of said heater at a maximum rate when the ratio O/U is equal to zero and to decrease said thermal output at a maximum rate when the ratio O/U approaches infinity, said principal control means also being adapted to decrease said thermal output at a rate proportional to U/O − 1 when O/U has a value between 1 and infinity and to increase said thermal output at a rate proportional to 1 − O/U when O/U has a value between zero and unity.

8. A system for controlling the application of heat to an electrolytic substance for the maintenance of a predetermined temperature therein, said system comprising the combination of means defining a heating chamber for the substance, electrodes adapted to pass an electric current through the substance within said heating chamber, means responsive to the temperature of the substance within said heating chamber, means including an adjustably positionable member for varying the effective resistance to the passage of current through the substance within said heating chamber, means governed by said temperature responsive means for shifting said adjustably positionable member to vary progressively the power input to the substance within said heating chamber, and additional means also governed by said temperature responsive means for effecting immediate but minor alterations in the power input to the substance within said heating chamber without altering the position of said adjustably positionable member.

9. A system for controlling the application of heat to an electrolytic substance for the maintenance of a predetermined temperature therein, said system comprising the combination of means defining a heating chamber for the substance, electrodes adapted to pass an electric current through the substance within said heating chamber, a thermal switch responsive to the temperature of the substance leaving said heating chamber, a dielectric shield adjustably positionable relative to said electrodes and adapted to vary the effective resistance to the passage of current through the substance within said heating chamber, electrical control means governed by said thermal switch for shifting said dielectric shield to vary progressively the power input to the substance within said heating chamber, and additional electrical control means also governed by said thermal switch for effecting a relatively small change in the potential applied to said electrodes accompanied by a corresponding change in the power input to the substance within said heating chamber, said relatively small change taking place without altering the position of said adjustably positionable member.

10. A control system for raising the temperature of an electrolytic fluid to a predetermined level through the controlled application of heat thereto, said system comprising the combination of a heater having fluid inlet and discharge connections, spaced electrodes adapted to pass an electric current through the fluid within said heater, a thermal switch responsive to the final temperature of the fluid passing through said heater, a principal heat control means for instituting a continuing, progressive and corrective change in the effective resistance between said electrodes to correspondingly change the rate of heat application of said heater within periods following the response of said thermal switch to a final fluid temperature departing from the predetermined level, said principal heat control means being governed by said thermal switch, and a secondary heat control means also governed by said thermal switch for alternatively interposing or shunting out of the electrode circuit a relatively small resistance to institute an immediate, total and limited corrective change in the potential applied to said electrodes following response of said thermal switch to a final fluid temperature departing from the predetermined level, the corrective change in applied potential being accompanied by a corresponding change in the rate of heat application.

11. A control system for increasing the temperature of an electrolytic fluid to a predetermined value through the controlled application of heat thereto, said system comprising the combination of means defining a heating chamber for the fluid, spaced electrodes for passing an electric current through the fluid within the heating chamber, a thermostatic device responsive to the final temperature of the fluid discharged from said heating chamber, a principal heat control means governed by said thermostatic device and adapted for correctively modifying the effective electrical resistance between said electrodes continuously and progressively upon departure of the final fluid temperature from the predetermined value, and a secondary heat control means also governed by said thermostatic device for alternatively adding or subtracting a given increment from the potential applied to said electrodes by cutting a relatively small reactance into or out of their circuit, said secondary heat control means being adapted to correctively modify the rate of heat energy input to the fluid within said heating chamber immediately upon departure of the final fluid temperature from said predetermined value.

12. A control system for raising an electrolytic fluid to a predetermined temperature through the controlled application of heat thereto, said system comprising the combination of a heater, spaced electrodes for passing an electric current through the fluid in said heater, means responsive to the temperature of the fluid discharged from said heater, a principal heat control means for instituting a continuing and progressive decrease in the effective resistance of the fluid between said electrodes within periods following the response of said temperature responsive means to a temperature below a predetermined level and for also instituting a continuing and progressive increase in the effective resistance of the fluid between said electrodes within periods following the response of said temperature responsive means to a temperature above the predetermined level, said principal heat control means being governed by said temperature responsive means, and a secondary heat control means also governed by said temperature responsive means and adapted for instituting an immediate, total and limited increase in the potential applied to said electrodes following response of said temperature responsive device to a temperature below the predetermined level and to institute an immediate, total and limited decrease in the potential applied to said electrodes following response of said temperature responsive device to a temperature above the predetermined level.

13. A system for maintaining a heated electrolytic fluid at a predetermined temperature and comprising the combination of a heater having a fluid inlet and a fluid discharge, electrodes for heating the fluid within said heater by passing an electric current therethrough, a bimetallic thermal switch disposed for response to the temperature of the fluid discharged from said heater, said switch being adapted to open when the fluid temperature departs in one direction from the predetermined temperature and to close when the fluid temperature departs in the opposite direction, a control relay operable in response to actuation of said bimetallic switch, a relatively small electrical resistor series-connected in the power supply circuit of said electrodes, a by-pass switch operable by said control relay for alternatively cutting said resistor into the electrical circuit or shunting said resistor out of said circuit to effect a relatively slight change in the potential applied to said electrodes, a dielectric shield disposed for movement relative to said electrodes to vary the effective electrical resistance therebetween, a reversible motor for adjustably positioning said shield, and a reversing switch operable by said control relay for driving said motor in alternative directions depending upon the condition of said bimetallic switch.

14. For use in a temperature control system having principal and secondary heat control means both governed by a thermostatic device so as to maintain the temperature of an electrolytic fluid at a predetermined level, a heater comprising the combination of means defining a heating chamber for the electrolyte, spaced electrodes adapted to pass current through the electrolyte within said heating chamber, and an adjustably positionable member subject to automatic actuation by the principal heat control means but not said secondary heat control means for varying the power input to said electrolyte by varying the effective resistance to the flow of current between said electrodes.

15. For use in a temperature control system having a principal and a secondary heat control means both governed by a thermal switch so as to maintain the temperature of an electrolytic fluid at a predetermined level, a heater comprising, in combination, a hollow body having a fluid heating chamber communicating with an inlet and an outlet, electrodes mounted in spaced relation on said body and adapted to pass current through the fluid as the latter flows through said heating chamber, a dielectric shield of paddle-like form housed within said body and interposed between said electrodes, a supporting stem fixed to said dielectric shield and journaled in a panel of said body, a reversible motor drivingly connected with said stem for varying the angular position of said shield relative to said electrodes to effect a corresponding variation in the effective electrical resistance therebetween, said motor being subject to automatic actuation by said principal heat control means but not said secondary heat control means.

16. A system for controlling the application of heat to a substance to maintain the temperature of the same at a predetermined level, said system comprising the combination of a container adapted to hold said substance, spaced terminals for heating the substance within said container by means of an electric current, a single throw thermostatic means adapted to respond upon occurrence of the predetermined temperature level in said substance, a principal control means governed by said temperature responsive means for instituting a continuing and progressive decrease in the potential applied to said terminals in response to a temperature above said predetermined level and a like increase in potential in response to a temperature below the predetermined level, and a secondary control means also governed by said temperature responsive means, said secondary control means being adapted to effect immediately an increment in the potential applied on said terminals when said temperature responsive means reacts to a temperature decrease below said predetermined level and to effect immediately a decrement in said potential when said temperature responsive means reacts to a temperature rise above said predetermined level.

17. A system for controlling the application of heat to a substance for the maintenance of a predetermined temperature level therein and comprising, in combination, a heater adapted to hold said substance, spaced terminals for subjecting the substance in the heater to heating by means of an electric current, a single throw thermostatic device responsive to the predetermined temperature level in said substance, a principal heat control means governed by said thermostatic device for instituting a continuing and progressive decrease in the potential applied to said terminals in response to a temperature above said predetermined level and a like increase in potential in response to a temperature below the predetermined level, and a secondary control means also governed by said thermostatic device, said secondary heat control means being adapted to effect immediately an increment in the potential applied on said terminals when said thermostatic device responds to a temperature decrease below said predetermined level and to effect immediately a decrement in said potential when said temperature responsive means responds to a temperature rise above said predetermined level, said principal and said secondary heat control means being so constructed that within a predetermined time interval immediately following response to a change in temperature the change in rate of heat application effected by the secondary control means will be greater than that effected by the principal control means and in any such period greater than said time interval the effect of the principal control means upon the rate of heat application will be greater than that of the secondary control means.

18. A control system for increasing the temperature of an electrolytic fluid to a predetermined value through the controlled application of heat thereto, said system comprising the combination of a heater for the fluid, spaced electrodes for passing an electric current through the fluid in said heater, a single bimetallic thermostatic device responsive to the final temperature of the fluid discharged from said heater, a principal heat control means governed by said thermostatic device and adapted for correctively modifying the rate of heat energy input to the fluid within said heater by instituting a continuous and progressive change in the potential applied to said electrodes upon departure of the final fluid temperature from the predetermined value, and a secondary heat control means also governed by said thermostatic device for alternatively modifying by a relatively small increment the potential applied to said electrodes through the expedient of effecting a relatively small change in their circuit reactance, said secondary heat control means being adapted to correctively modify the rate of heat energy input to the fluid within said heater immediately upon departure of the final fluid temperature from said predetermined value.

19. A system for maintaining a heated electrolytic fluid at a predetermined temperature and comprising the combination of a heater having a fluid inlet and a fluid discharge, electrodes for heating the fluid within said heater by passing an electric current therethrough, a single throw thermal switch disposed for response to the temperature of the fluid discharged from said heater, said switch being adapted to open when the fluid temperature departs in one direction from the predetermined temperature and to close when the fluid temperature departs in the opposite direction, a control relay operable in response to actuation of said thermal switch, a saturable reactor series-connected in the power supply circuit of said electrodes, a control circuit for the saturating winding of said reactor, means governed by said thermal switch and said control relay for effecting relatively slight and immediate changes in the current flow of said control circuit, and means also governed by said thermal switch and said control relay for effecting gradual and progressive changes in the current flow of said control circuit, all of said changes in the current of said control circuit serving to vary the potential applied to said electrodes.

20. In a temperature control system of the character set forth, the combination comprising a heater having a fluid inlet and a fluid discharge, terminals on said heater for heating the fluid therein by means of an electric current, a single bimetallic switch responsive to the temperature of the fluid discharged from said heater, a control relay operable in response to actuation of said bimetallic switch, a saturable reactor series-connected in the power supply circuit of said terminals, a control circuit for the saturating winding of said reactor, a relatively small resistor series-connected in said control circuit, a by-pass switch operable by said control relay for alternatively cutting said resistor into or shunting said resistor out of said control circuit to effect corresponding variations in the saturation of said reactor and in the potential applied to said terminals, a rheostat in said control circuit adapted to produce progressive changes in the current flow therein with corresponding changes in the potential applied to said terminals, a reversible motor for operating said rheostat, a reversing switch operable by said control relay for driving said motor in alternative directions depending upon the condition of said bimetallic switch, and a time delay device interposed between said reversing switch and said motor for precluding operation of said rheostat until the elapse of a predetermined time interval.

21. A temperature control system for increasing the temperature of a moving stream of fluid to a predetermined value through the controlled application of heat thereto, said system comprising the combination of means defining a heating chamber for the fluid, main and auxiliary heating elements within said heating chamber, a thermostatic device responsive to the final temperature of the fluid discharged from said heating chamber, a principal heat control means governed by said thermostatic means and adapted for correctively modifying the thermal output rate of said main heating element continuously and progressively upon departure of the fluid temperature from the predetermined value, and a secondary heat control means also governed by said thermostatic device and adapted to correctively modify the thermal output rate of said auxiliary heating element immediately upon departure of the final fluid temperature from said predetermined value.

22. A temperature control system for controlling the application of heat to a fluid substance for the maintenance of a predetermined temperature therein, said system comprising the combination of means defining a heating chamber for the fluid, main and auxiliary heating elements within said heating chamber, a thermal switch responsive to the temperature of the fluid discharged from said heating chamber, a control relay operable in response to actuation of said thermal switch, valve means operable by said control relay for correctively modifying the thermal output rate of said auxiliary heating element immediately upon departure of the final fluid temperature from the predetermined temperature, a reversible motor operable by said control relay through a reversing switch, and additional valve means adapted for actuation by said motor for correctively modifying the thermal output rate of said main heating element continuously and progressively upon departure of the fluid temperature from the predetermined temperature.

CARROLL R. ALDEN.

REFERENCES CITED

The following references are of record in the file of this patent:

UNITED STATES PATENTS

| Number | Name | Date |
| --- | --- | --- |
| 1,960,162 | Moorshead | May 22, 1934 |
| 2,052,396 | Getchell | Aug. 25, 1936 |
| 2,100,327 | Getchell | Nov. 30, 1937 |
| 2,190,232 | Fry | Feb. 13, 1940 |
| 2,311,118 | Matthews et al. | Feb. 16, 1943 |